United States Patent
Koyama

(10) Patent No.: US 10,550,947 B2
(45) Date of Patent: Feb. 4, 2020

(54) BLOCK VALVE AND BLOCK VALVE FOR RAW MATERIAL CONTAINER

(71) Applicant: Kitz SCT Corporation, Tokyo (JP)

(72) Inventor: Goki Koyama, Tokyo (JP)

(73) Assignee: KITZ SCT CORPORATION, Tokyo (JP)

(*) Notice: Subject to any disclaimer, the term of this patent is extended or adjusted under 35 U.S.C. 154(b) by 240 days.

(21) Appl. No.: 15/520,607

(22) PCT Filed: Jan. 12, 2016

(86) PCT No.: PCT/JP2016/050723
§ 371 (c)(1),
(2) Date: Apr. 20, 2017

(87) PCT Pub. No.: WO2016/114266
PCT Pub. Date: Jul. 21, 2016

(65) Prior Publication Data
US 2017/0335981 A1    Nov. 23, 2017

(30) Foreign Application Priority Data

Jan. 16, 2015 (JP) ................................. 2015-006661

(51) Int. Cl.
*F16K 11/22* (2006.01)
*F16K 49/00* (2006.01)
(Continued)

(52) U.S. Cl.
CPC ............... *F16K 11/22* (2013.01); *F16K 1/36* (2013.01); *F16K 7/16* (2013.01); *F16K 27/003* (2013.01);
(Continued)

(58) Field of Classification Search
CPC .......... F16K 7/16; F16K 11/22; F16K 27/003; F16K 27/0236; F16K 41/12
See application file for complete search history.

(56) References Cited

U.S. PATENT DOCUMENTS 4,339,111 A * 7/1982 Welch ....................... F16K 7/16
137/238
4,558,845 A * 12/1985 Hunkapiller ......... B01J 19/0046
137/606
(Continued)

FOREIGN PATENT DOCUMENTS

JP           6-1946        1/1994
JP         2000-174005     6/2000
(Continued)

OTHER PUBLICATIONS

International Search Report dated Apr. 19, 2016 in International Application No. PCT/JP2016/050723.

*Primary Examiner* — Mary E McManmon
*Assistant Examiner* — Richard K. Durden
(74) *Attorney, Agent, or Firm* — Wenderoth, Lind & Ponack, L.L.P.

(57) ABSTRACT

A block valve and a block valve for a raw material container having a structure in which a retaining part of a liquid material or cleaning fluid is not present inside. In the block valve, a first side of a main flow path in communication with a supply route of a block body and a first minimal port part of a first diaphragm valve in a tilted state with respect to the block body are connected, a second side of the main flow path and a second minimal port part of a second diaphragm valve are connected, a port opening of the second diaphragm valve is in communication with a supply port part, and a joint port part of the first diaphragm valve and a connection line in a vertical direction are connected by a communication path.

6 Claims, 11 Drawing Sheets

(51) Int. Cl.
*F16K 27/02* (2006.01)
*F16K 41/00* (2006.01)
*F16K 1/36* (2006.01)
*F16K 27/00* (2006.01)
*F16K 7/16* (2006.01)

(52) U.S. Cl.
CPC .......... *F16K 27/0236* (2013.01); *F16K 41/00* (2013.01); *F16K 49/00* (2013.01)

(56) References Cited

U.S. PATENT DOCUMENTS

| | | | | |
|---|---|---|---|---|
| 4,898,210 A * | 2/1990 | Nitta | ........................ | F17C 13/04 137/316 |
| 4,903,722 A * | 2/1990 | Joseph | .................... | F16K 1/302 137/209 |
| 4,968,003 A * | 11/1990 | Danko | ...................... | F16K 7/16 251/239 |
| 5,224,513 A * | 7/1993 | Bertone | ................ | C23C 16/455 137/240 |
| 5,295,660 A * | 3/1994 | Honma | .................. | F16K 35/00 251/288 |
| 5,657,786 A * | 8/1997 | DuRoss | .............. | C23C 16/4408 134/166 C |
| 5,664,759 A * | 9/1997 | Evans | ................ | C23C 16/4401 137/614.21 |
| 5,829,472 A * | 11/1998 | Greenwood | .............. | F16K 7/16 137/312 |
| 5,975,112 A * | 11/1999 | Ohmi | .................... | F16K 27/003 137/240 |
| 6,012,479 A * | 1/2000 | Fukushima | ........... | F16K 27/003 137/271 |
| 6,035,893 A * | 3/2000 | Ohmi | .................. | F15B 13/0814 137/597 |
| 6,257,270 B1 * | 7/2001 | Ohmi | .................... | F16K 27/003 137/240 |
| 6,273,139 B1 * | 8/2001 | Ohmi | .................... | F16K 27/003 137/884 |
| 6,752,387 B1 * | 6/2004 | Nishizato | ............... | B01D 3/346 118/726 |
| 7,472,887 B2 * | 1/2009 | Ohmi | ........................ | F16K 7/14 251/331 |
| 8,707,997 B2 * | 4/2014 | Igarashi | .................... | F16K 11/20 137/563 |
| 2001/0022353 A1 * | 9/2001 | Takeda | .................... | F16K 1/305 251/276 |
| 2002/0124894 A1 * | 9/2002 | Ohmi | .................... | F16K 27/003 137/606 |
| 2006/0048830 A1 * | 3/2006 | Tokuda | .................. | F16K 27/003 137/884 |
| 2009/0151432 A1 * | 6/2009 | Minoda | .............. | B01D 15/1842 73/61.56 |
| 2009/0250126 A1 | 10/2009 | Koyomogi | | |
| 2014/0299201 A1 * | 10/2014 | Hirose | .................. | F16K 27/003 137/240 |

FOREIGN PATENT DOCUMENTS

JP      2007-78006      3/2007
JP      4125633      7/2008

* cited by examiner

Fig. 8
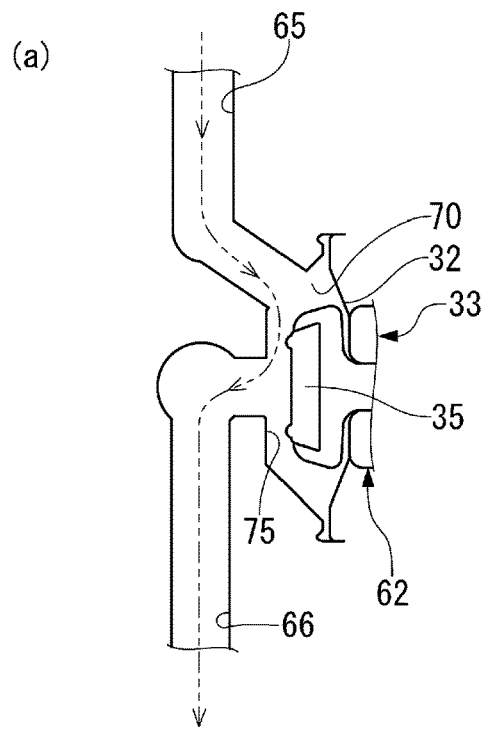
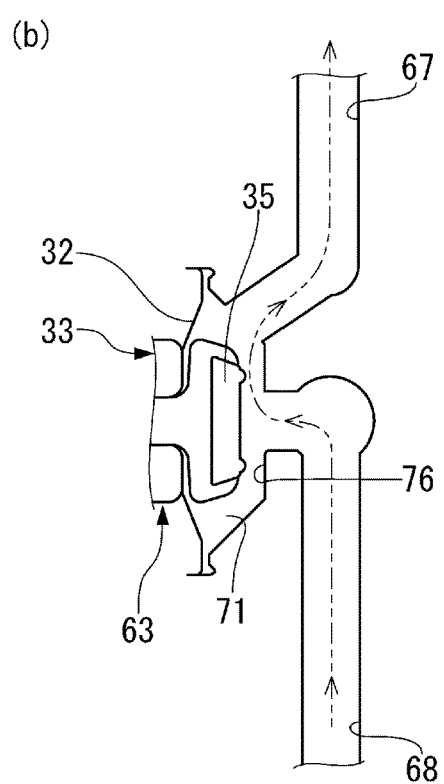

Fig. 10
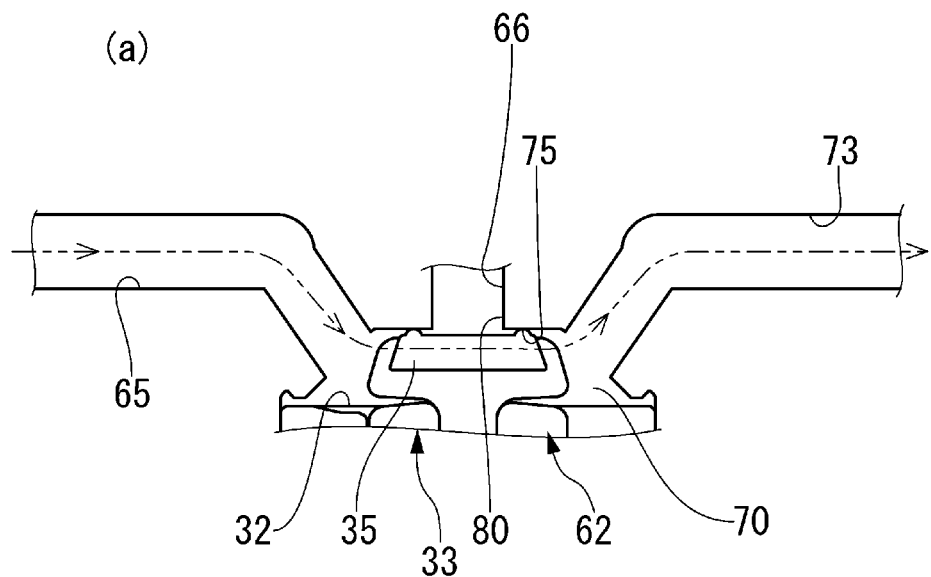
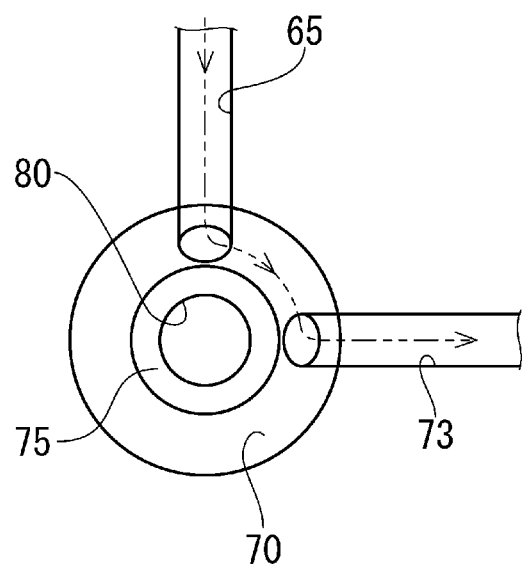

Fig. 11
(a)
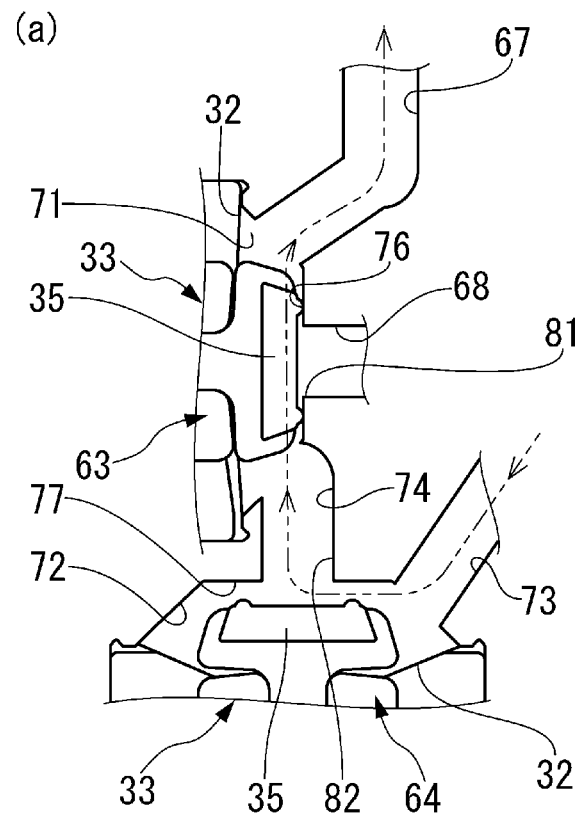
(b)
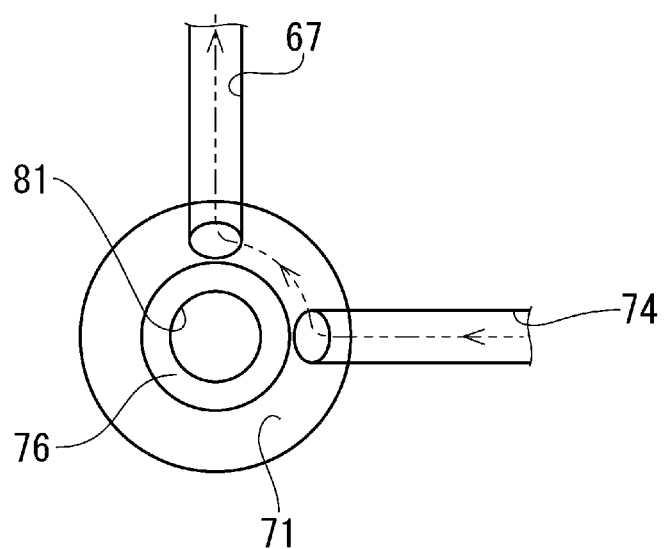

BLOCK VALVE AND BLOCK VALVE FOR RAW MATERIAL CONTAINER

TECHNICAL FIELD

The present invention relates to a block valve and a block valve for a raw material container and, in particular, is applied to a block valve for a raw material container to be attached for use to the raw material container for supplying a liquid material to a semiconductor manufacturing apparatus and relates to a block valve for a raw material container in a structure in which a residual liquid such as a liquid material or cleaning fluid is not retained inside a valve.

BACKGROUND ART

To perform deposition by a CVD scheme or the like in electronic device manufacturing including a semiconductor manufacturing process, as a precursor of organic metal, for example, a liquid for deposition with high purity such as TDMAT (Tetrakis (Dimethylamino) Titanium) is used. This liquid material (such as TDMAT) may be accommodated in a raw material container. To the raw material container, a gas introduction pipe and a discharge pipe may be connected. From the gas introduction pipe, an inert carrier gas such as He or $N_2$ may be fed to pressurize the inside of the raw material container, and the liquid material accommodated in the raw material container may be supplied via the discharge pipe to a semiconductor manufacturing apparatus.

In a midway of this discharge pipe, for example, a gate valve for controlling supply of the liquid material to the semiconductor manufacturing apparatus is provided. Also, on a secondary side (semiconductor manufacturing apparatus side) of this gate valve, a purge pipe for introducing a purge gas to a supply line to the discharge pipe and the semiconductor manufacturing apparatus is branched. In a midway of the purge pipe branched from the discharge pipe, a purge valve which is normally closed and opened at a purge process to introduce a purge gas is provided. Also, on a downstream side of these discharge pipe, gas introduction pipe, and purge pipe, a connector is attached.

With the discharge pipe and the gas introduction pipe being connected to the raw material container, the raw material container can be separated from the supply line to the semiconductor manufacturing apparatus and so forth.

When the raw material container becomes empty or when a liquid material of another type is supplied to the semiconductor manufacturing apparatus, prior to removal of the raw material container from the semiconductor manufacturing apparatus, a purge process is performed to remove the liquid material remaining inside the discharge pipe and the supply line. At the purge process, the gate valve is closed, and the purge valve provided to the purge pipe is opened, thereby introducing the purge gas from a purge gas supply source to the purge pipe. The purge gas flows from the purge pipe via a branching part through the supply line including the discharge pipe, and is discharged outside the semiconductor manufacturing apparatus. By this supply of the purge gas, the liquid material remaining inside the discharge pipe and a liquid-phase line can be removed.

However, in the valve for the raw material container in this conventional structure with a combination of pipe lines (pipe) and valves, it is required to branch the purge pipe at an upper portion of the gate valve provided to the discharge pipe. Therefore, the structure is such that the gate valve and the purge valve are stacked in a vertical direction. In a pipe line between the gate valve and the purge valve, a retaining part (dead volume) of the liquid material is formed. Thus, at the purge process, while removal of the liquid material remaining in the pipe line can be performed in a relative short time, removal of the liquid material remaining in this dead volume is difficult, and a time required for the purge process is long.

In particular, when the liquid material for use is a chemical substance with a low vapor pressure such as TDMAT, to completely remove the liquid material remaining in this retaining part, a long-time purge process is required, and requiring a long purge process time decreases an operating rate of the semiconductor manufacturing apparatus, and becomes a large factor in inhibiting productivity.

Also, if the purge process is insufficient, the liquid material remains in the dead volume. Therefore, when the raw material container having a liquid material of a different type accommodated therein is connected to the semiconductor manufacturing apparatus thereafter to start supply of that liquid material, the components of the liquid material remaining in the supply line is mixed into that liquid material, and the polluted liquid material is supplied to the semiconductor manufacturing apparatus although a liquid material with high purity or ultrahigh purity is required.

In Japanese Patent No. 4125633 suggested as a valve for a container of this type, in order to allow a purge process to be performed in a short time even when a high-purity liquid material with a low vapor pressure is used, a valve manifold for a raw material container configured with a low dead volume has been known. In this valve manifold, diaphragm surfaces of two diaphragm valves are opposed to each other to be disposed in a manifold block, and a flow path coupling port openings of these valves and a flow path communicating with port openings of the respective valves from outside are provided in the manifold block.

Thus, unlike the conventional valve for the raw material container, a dead volume due to the structure with a combination of pipe lines (pipes) and valves is not formed in the flow path in the manifold block, and a wet surface area of the flow path formed in the manifold block can be minimized. Therefore, a purging process can be completed in a significantly shorter time than a purging time conventionally required for a liquid material with a low vapor pressure.

When a purge process on a flow path in this valve assembly mounted at an upper portion of the raw material container is performed, a valve on a side leading to the raw material container is opened, a valve on a side leading to a vacuum source is closed, and a purge gas is introduced from a purge-gas introduction source via a liquid-phase line branched from a flow path connecting the valves together to push back a liquid material remaining in the valve assembly to the raw material container. Then, the valve on the side leading to the raw material container is closed, the valve on the side leading to the vacuum source is opened, and the purge gas is introduced again via the liquid-phase line to perform a purge process in the flow of the assembly.

Technical Problem

In a horizontally-opposed-type block diaphragm valve assembly configuring the valve manifold suggested in Japanese Patent No. 4125633, to make a flow path between valve assemblies shortest, a structure is adopted in which two diaphragms of two diaphragm valves are arranged so as to be opposed to each other. Thus, below a port part of the diaphragm valve on the side leading to the raw material container and communicating with the raw material container, a space where the liquid material is retained is present, and the liquid material retained in this retaining part (dead volume) cannot be pushed back by the purge gas to the raw material container. Moreover, a retaining part of the liquid material is present also below a seat part of the valve on the side leading to the vacuum source. When a residual liquid of the liquid material is present in the liquid-phase line including the inside of the semiconductor manufacturing apparatus at the purge process, the residual liquid is flowed back to enter this retaining part. However, this retaining part is present below a main flow path where a purge gas is introduced, the liquid material remaining in the retaining part cannot be pushed out by the purge gas outside the valve.

While the liquid material can be easily removed by a purge process in the flow path communicating between the diaphragm valves and the flow path coupling between valve assemblies, removal of the liquid material remaining in the valve is difficult, causing a pollution of the high-purity liquid material due to mixture of a material of a different lot or a residual cleaning fluid. Moreover, after the raw material container is removed from the semiconductor manufacturing apparatus, the liquid material remaining in the valve is exposed to the atmosphere to undergo an oxidation reaction to cause a malfunction of the valve, and valve replacement may be required.

SUMMARY OF INVENTION

The present invention was developed to solve the problems, and has an object of providing a block valve and a block valve for a raw material container having a structure in which a retaining part of a liquid material or cleaning fluid is not present inside, capable of performing a purge process in a short time, and suitable for use of a liquid material with high purity.

Solution to Problem

To achieve the object described above, the invention is directed to a block valve, in which one side of a main flow path communicating with a supply route of a block body and a first minimal port part of a first diaphragm valve disposed in a tilted state with respect to the block body are connected, another side of the main flow path and a second minimal port part of a second diaphragm valve are connected, a port opening of the second diaphragm valve is communicated by a supply port part, and a joint port part of the first diaphragm valve and a connection line in a vertical direction are connected by a communication path, this communication path being a tilted flow path in a tilted state.

The invention is further directed to the block valve, in which the supply port part is disposed at a position lower than a seat part of the second diaphragm valve and at a lowermost part of the block body.

The invention is further directed to a block valve for a raw material container, in which one side of a main flow path communicating with a purge gas out-port as a supply flow path of a block body and a minimal port part of a tank gate valve as a first diaphragm valve disposed in a tilted state with respect to the block body are connected, a minimal port part of a purge gas introduction automatic valve as a second diaphragm valve is connected to another side of the main flow path, a port opening of the purge gas introduction automatic valve and a purge gas in-port part as a purge gas supply port part are communicated, and a joint port part of the tank gate valve and a liquid-phase flow path of a raw material container as a connection line in a vertical direction are connected by a communication path, this communication path being a tilted flow path in a tilted state.

The invention is further directed to the block valve for the raw material container, in which the purge gas in-port part is disposed at a position lower than a seat part of the purge gas introduction automatic valve and at a lowermost part of the block body.

The invention is further directed to the block valve and the block valve for the raw material container, in which an actuation mechanism which actuates a diaphragm provided in a casing of each of the first and second diaphragm valves is provided, a suspension-type pressing seat member is provided to the diaphragm, a seat part to make a seal contact with the pressing seat member is provided to a valve opening of the minimal port part opposing this pressing seat member, and a capacity of a flow path communicating the valve opening of the minimal port part and the main flow path is at minimum.

The invention is further directed to the block valve and the block valve for the raw material container, in which a heater function is disposed in the block body, and a material wetting a wall surface of the flow paths and an oxidation source attached by atmospheric exposure are removed by heating of this heater.

Advantageous Effects of Invention

From the invention, by disposing the first diaphragm valve in a tilted state, the joint port part can be provided at a position lower than the seal part of this valve. By connecting this joint port part and the connection line in the vertical direction by the communication path as a tilted flow path in a tilted state, the liquid in the first diaphragm valve can be let flow via the joint port part and the communication path to the connection line when the first diaphragm valve is closed. Therefore, the liquid is prevented from remaining in the first diaphragm valve.

Also, since the port opening of the second diaphragm valve and the supply port part are communicated, the fluid can be introduced from the supply port part via the second diaphragm valve to the main flow path of the block body and the supply flow path, and the fluid present in the flow path can be pushed out to the outside of the block valve for removal.

Thus, a cause for polluting a high-purity liquid material due to mixture of a liquid of a different type or a residual cleaning fluid can be prevented. Also, a cause for a malfunction of the valve because the liquid remaining in the valve is exposed to the atmosphere to undergo an oxidation reaction can be prevented.

Furthermore, since two diaphragm valves are jointed at both ends of the main flow path of the block body via the minimal port of each valve, the capacity of the main flow path can be minimized, and the content of the liquid remaining in the main flow path when the first diaphragm valve is closed can be minimized. Therefore, a purge process time can be reduced.

From the invention, the supply port part is disposed at the lowermost part of the block body, and is linked to the port opening at the position lower than the seat part of the second diaphragm valve. Therefore, the fluid introduced from the support port part is introduced from the lowermost position of the second diaphragm valve into the valve. Therefore, the liquid present in the second diaphragm valve is pushed out to the main flow path via the second minimal port by the fluid introduced from the supply port part, and the liquid does not remain in the second diaphragm valve.

From the invention, the tank gate valve is disposed in a tilted state, and the joint port part is provided at the position lower than a seal part. By connecting this joint port part and the liquid-phase flow path of the raw material container by the communication path as a tilted flow path in a tilted state, the liquid material present in the tank gate valve when the tank gate valve is closed can be returned to the raw material container via the joint port part and the communication path. Therefore, the liquid material does not remain in the tank gate valve.

Also, since the port opening of the purge gas introduction automatic valve and the purge gas in-port part as the purge gas supply port part are communicated, the purge gas can be introduced from the purge gas in-port part via the purge gas introduction automatic valve to the main flow path of the block body and the supply flow path, and the liquid material present in these flow paths can be pushed out to the outside of the block body via the purge gas out-port for removal.

Thus, the high-purity liquid material is prevented from being polluted because a material of a different lot is mixed or a cleaning fluid remains. Also, the liquid material remaining in the valve is prevented from being exposed to the atmosphere to undergo an oxidation reaction to cause a malfunction of the valve.

Furthermore, the tank gate valve is jointed to one side of the main flow path of the block body and the purge gas introduction automatic valve is jointed to the other side thereof by each minimal port of each valve. Therefore, the capacity of the main flow path is minimized, and the content of the liquid material remaining in the main flow path when the tank gate valve is closed can be minimized. Therefore, this remaining liquid material can be easily pushed out to the outside of the block body by the purge gas. Also, by minimizing the capacity of the main flow path, the wet area of the wall surface of the flow path can be minimized. Therefore, a time for removing the liquid material wetting the wall surface of the flow path can be reduced.

From the invention, the purge gas in-port part is disposed at the lowermost part of the block body and is linked to the port opening at the position lower than the seat part of the purge gas introduction automatic valve. Therefore, the purge gas introduced by the purge gas in-port part is introduced into the valve from the lowermost position of the purge gas introduction automatic valve, and the liquid material present in the valve is pushed up by the purge gas to be pushed out to the main flow path from the second minimal port and pushed out to the outside of the block body via the purge gas out-port. Therefore, the liquid material does not remain in the purge gas introduction automatic valve.

From the invention, the suspension-type pressing seat member is provided to the diaphragm, and the seat part to make a seal contact with the pressing seat member is provided to the valve opening of the minimal port part opposing this pressing seat member. Therefore, since it is not required to provide a valve seat accommodation portion on a valve opening side, the capacity of a flow path communicating the valve opening and the main flow path can be minimized. Thus, since the capacity of the fluid remaining in the main flow path is minimum when the valve is closed, a purge processing time can be reduced.

From the invention, when the viscosity of the liquid material is high, the viscosity of the liquid material is decreased by heating by the heater to increase fluidity, thereby making the liquid material easily flow through the flow path in the block valve. Also, by heating the block body by the heater, vaporization of the liquid material wetting the wall surface of the flow path and an oxidation source (such as moisture) attached to the valve by atmospheric exposure can be promoted for removal.

BRIEF DESCRIPTION OF DRAWINGS

In FIG. 8, (a) is a schematic view depicting a portion near an introduction route in FIG. 7. (b) is a schematic view depicting a portion near a discharge route in FIG. 7.

In FIG. 10, (a) is a schematic view depicting a portion near the introduction route in FIG. 9. (b) is a schematic view depicting a portion near a seat part of (a).

In FIG. 11, (a) is a schematic view depicting a portion near a discharge route in FIG. 9. (b) is a schematic view depicting a portion near a seat part of (a).

DESCRIPTION OF EMBODIMENTS

Figure 1:
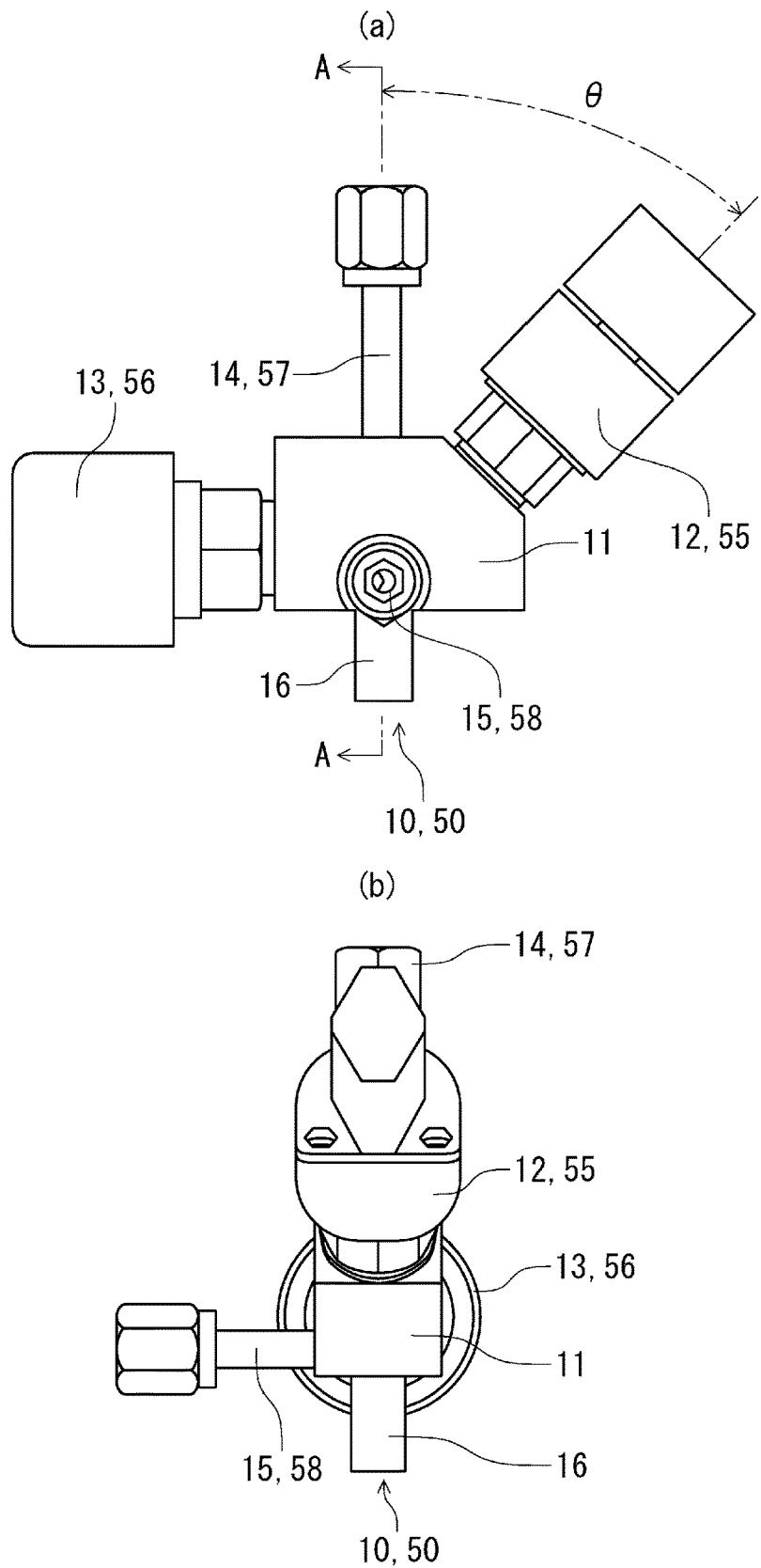
In FIG. 1, (a) is a front view depicting one embodiment of a block valve and a block valve for a raw material container in the present invention. (b) is a right side view thereof.
Figure 2:
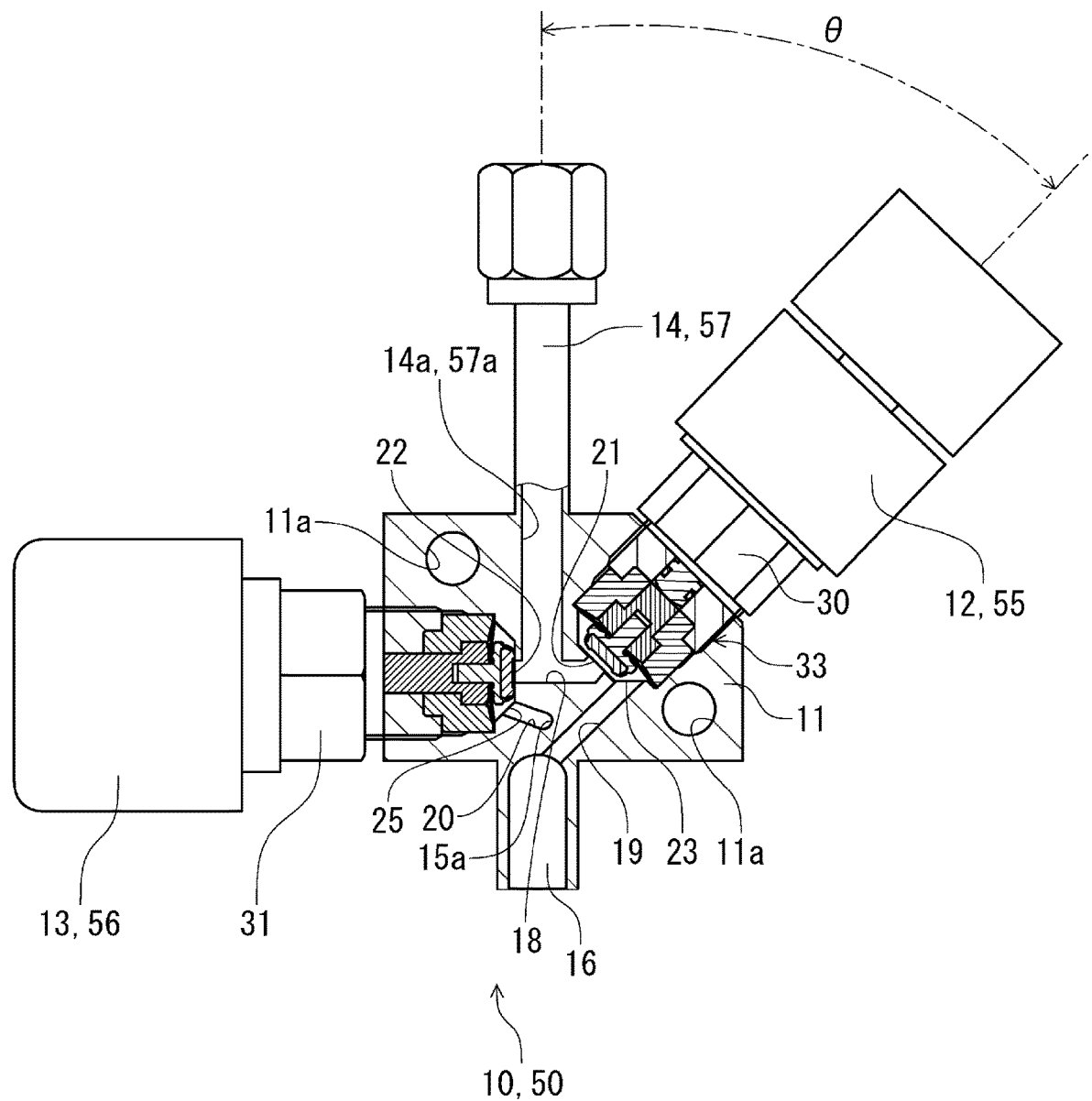
FIG. 2 is a partially sectional view of FIG. 1(a).
Figure 3:
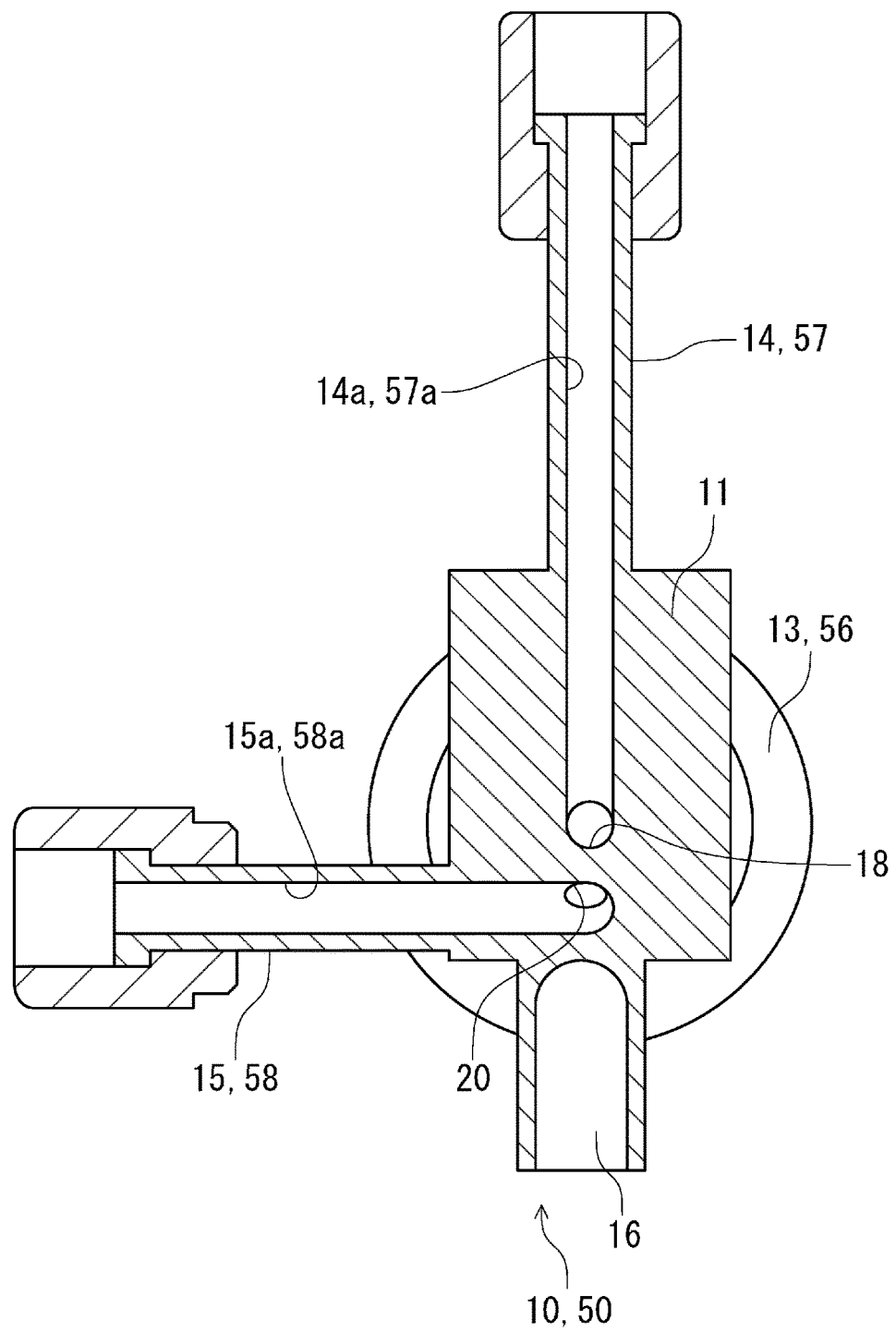
FIG. 3 is an enlarged A-A sectional view of FIG. 1(a).

In the following, embodiments of the block valve and the block valve for the raw material container in the present invention are described in detail based on the drawings. In FIG. 1, one embodiment of the block valve in the present invention is depicted. In FIG. 2, a partially sectional view of this block valve is depicted. In FIG. 3, a sectional view of this block valve is depicted. Also, in FIG. 4, a partially enlarged sectional view of this block valve is depicted.

In FIG. 1, a block valve 10 includes a block body 11, a first diaphragm valve 12 disposed in a tilted state with a tilt angle θ with respect to this block body 11, a second diaphragm valve 13 disposed in a horizontal state with respect to this block body 11, a supply route 14, a supply port part 15, and a connection line 16.

The block body 10 is made of, for example, a stainless alloy material. Inside the block body 11, as depicted in FIG. 2, a flow path 14a of the supply route 14, a main flow path 18, a communication path 19, a communication path 20, and a flow path 15a of the supply port part 15 are formed.

The flow path 14a of the supply route 14 is formed, as depicted in FIG. 3, vertically downward from above the block body 11, and a lower end of the flow path 14a communicates with the main flow path 18. The main flow path 18 is formed in a state of communicating with a lower end of the supply route 14. Its one end is coupled to a first minimal port part 21 of a first diaphragm valve 12, and the other end is coupled to a second minimal port part 22 of a second diaphragm valve 13.

The communication path 19 is formed as a tilted flow path with a tilt, and couples a joint port part 23 of the first diaphragm valve 12 and a connection line 16 in a vertical direction together for communication. Also, the communication path 20 couples a joint port part 25 of the second diaphragm valve 13 and a flow path 15a of a supply port part 15 for communication.

The supply port part 15 is disposed, as depicted in FIG. 3, at a lowermost part of the block body 11, and the flow path 15a is formed in a horizontal direction.

In this manner, since the flow paths are provided by being bored inside the block body 11, the flow paths can be formed in the shortest way, with a joint part for connecting a pipe line omitted, to achieve a structure in which a fluid is less prone to remain inside the flow paths. Also, inside the block body 11, a hole 11a for heater attachment is formed in a direction orthogonal to the main flow path 18.

Since the first diaphragm valve 12 is disposed in a tilted state with the tilt angle θ with respect to the block body 11, it is possible to provide the joint port part 23 of the first diaphragm valve 12 below the first minimal port part 21 and at a lowermost position in the first diaphragm valve 12. To form the joint port part 23 at the lowermost position in the first diaphragm valve 12, this tilt angle θ is preferably set at an angle on the order of 45 degrees.

Since the joint port part 23 of the first diaphragm valve 12 is provided below the first minimal port part 21 and at the lowermost position in the first diaphragm valve 12 and the joint port part 23 and the connection line 16 in the vertical direction are communicated by the communication path 19, the liquid present in the first diaphragm valve 12 easily flows out from the joint port part 23 via the communication path 19 to the connection line 16.

Since the second diaphragm valve 13 is disposed in a horizontal state with respect to the block body 11, a port opening 25 of the second diaphragm valve 13 can be arranged at a position lower than a seat part 27 of the second diaphragm valve 13.

Since the port opening 25 of the second diaphragm valve 13 is provided at the position lower than the seat part 27 of the second diaphragm valve 13, the fluid (purge gas) to be supplied from the supply port part 15 via the flow path 20 and from the port opening 25 to the inside of the second diaphragm valve 13 can be supplied into the second diaphragm valve 13 from the lowermost position.

Figure 4:
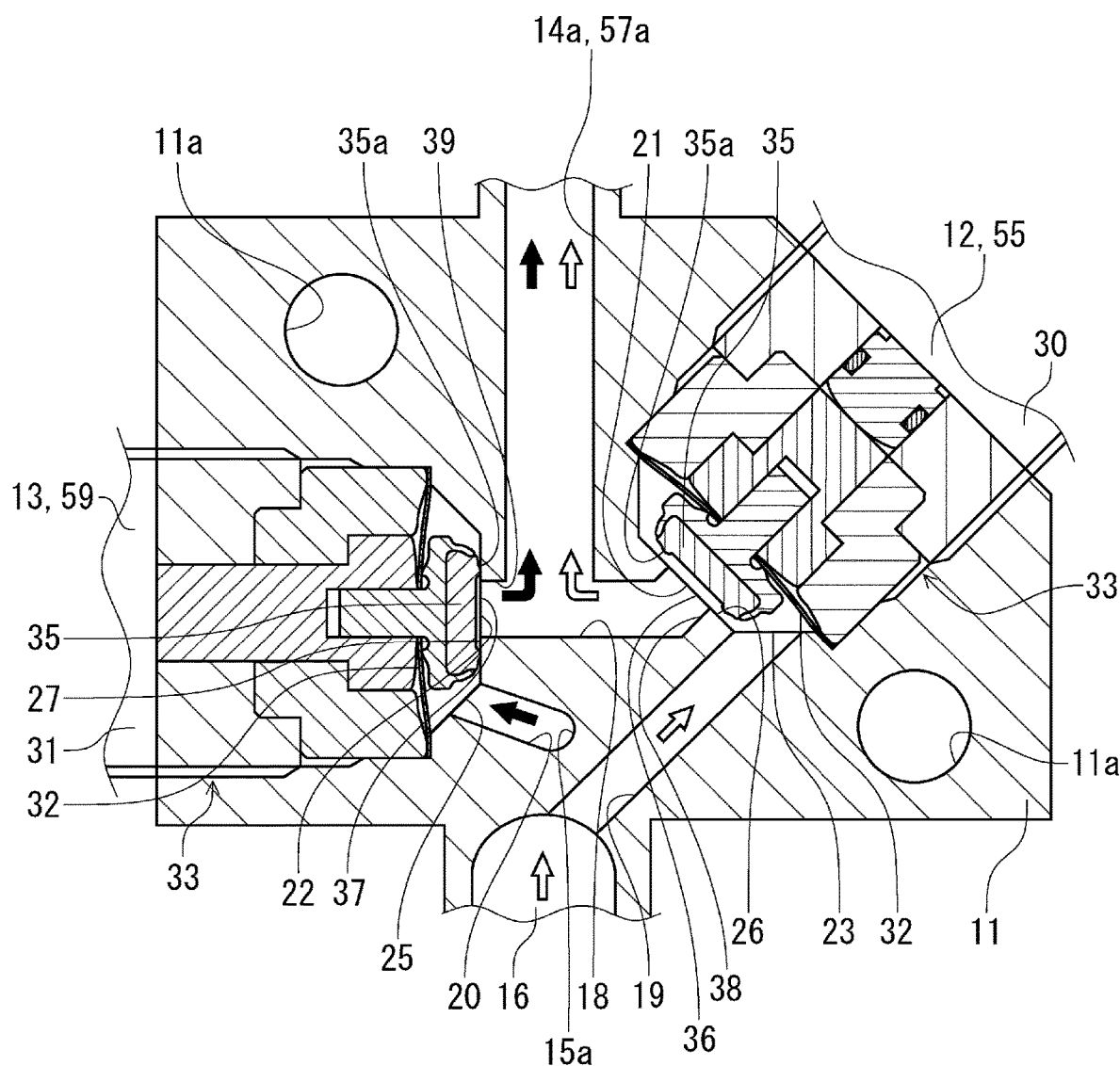
FIG. 4 is a partially enlarged sectional view of FIG. 1(a).

In FIG. 4, an enlarged sectional view of a block body 11 portion of the block valve 10 depicted in FIG. 2 is depicted.

In casings 30 and 31 of the first diaphragm valve 12 and the second diaphragm valve 13, actuation mechanisms 33, 33 for actuating diaphragms 32, 32 are provided. Also, the diaphragms 32, 32 of the first diaphragm valve 12 and the second diaphragm valve 13 are provided with suspension-type pressing seat members 35, 35. Also, on the periphery of valve openings 36 and 37 of the minimal port parts 21 and 22 opposing these pressing seat members 35, 35, seat parts 26 and 27 to make a seal contact with the pressing seat members 35, 35 are provided.

By actuating the diaphragms 32, 32 by the actuation mechanisms 33, 33 to attach and detach the pressing seat members 35, 35 provided in a state of being suspended on the diaphragms 32 to and from the seat parts 26 and 27 of the valve openings 36 and 37, valve open/close operation can be performed.

In the first diaphragm valve 12 and the second diaphragm valve 13, the structure is such that the suspension-type pressing seat members 35 are provided to the diaphragms 32 and the pressing seat members 35 suspended on the diaphragms 32 are attached and detached to and from the seat parts 26 and 27 on the periphery of the valve openings 36 and 37 for valve opening/closing. Therefore, only finishing the seat parts 26 and 27 so that they are smooth is enough, and it is not required to provide recesses for accommodating the seats. Thus, flow paths 38 and 39 for coupling the valve openings 36 and 37 of the minimal port parts 21 and 22 and the main flow path 18 can be shortened and their capacities can be made minimal, and the fluid amount remaining in the flow paths 38 and 39 can be minimized.

The seat members 35 are made of, for example, a resin material, with their tip side having formed thereon annular projecting parts 35a contactable with the seat parts 26 and 27. With these annular projecting parts 35a pressed onto the seat parts 26 and 27, the state becomes a closed-valve state.

The diaphragms 32 are made of an elastically-deformable metal material such as, for example, a stainless alloy material or Co—Ni alloy material, in a disc shape. To enhance durability, it is preferred to make the diaphragms of the Co—Ni alloy material rather than the stainless alloy material.

Figure 5:
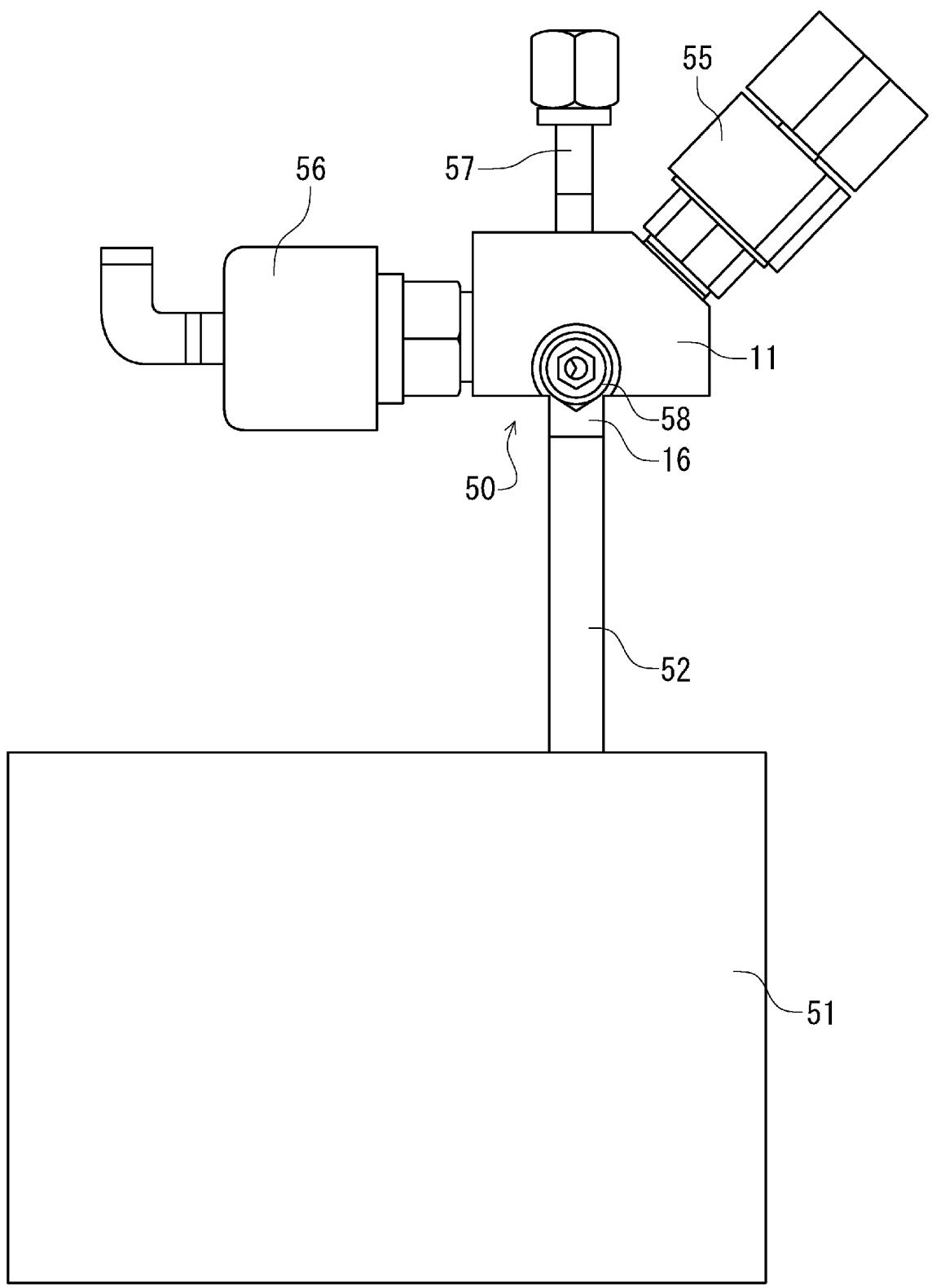
FIG. 5 is a front view depicting one embodiment of the block valve for the raw material container in the present invention.

Next, the block valve for the raw material container in the present invention is described. In FIG. 5, one embodiment of the block valve for the raw material container in the present invention is depicted. Note that the same sign is provided to a portion of the structure of the block valve for the raw material container common to the structure of the block valve described above, and description of that portion is omitted.

In FIG. 5, a block valve for a raw material container 50 is attached to a tip of a discharge pipe (liquid-phase flow path) 52 of a raw material container 51 via the connection line 16. With the pressure of an inert carrier gas such as He or N$_2$ introduced from a gas introduction line not depicted into the raw material container 51, the flow rate of a liquid material sent out from the raw material container 51 is controlled.

In FIG. 1, the block valve for the raw material container 50 includes a tank gate valve 55 as a diaphragm valve disposed in a tilted state with the tilted angle θ with respect to this block body 11, a purge gas introduction automatic valve 56 as a diaphragm valve disposed in a horizontal state with respect to this block body 11, a purge gas out-port 57, a purge gas in-port part 58, and the connection line 16. While a manual-type valve is used as the tank gate valve 55 in the present embodiment, an automatic-type diaphragm valve may be used. Also, while an automatic-type valve is used as the purge gas introduction automatic valve 56, a manual-type diaphragm valve may be used.

Also, the purge gas in-port part 58 is disposed, as depicted in FIG. 3, at a lowermost part of the block body 11, and a flow path 58a is formed in a horizontal direction. Other structures of the block valve for the raw material container 50 are identical to those of the block valve 10, and therefore description thereof is omitted.

By operating so as to open and close the tank gate valve 55, it is possible to control the flow rate of a fluid material to be supplied from the raw material container 51 via the liquid-phase flow path 52, the connection line 16, the communication path 19, the first minimal port part 21, the flow path 38, the main flow path 18, and the supply route 14 to a liquid-phase flow path of a semiconductor manufacturing apparatus not depicted.

By operating the purge gas introduction automatic valve 56, it is possible to control a purge gas to be supplied via the purge gas in-port part 58, the communication path 20, the port opening 25, the second minimal port part 22, the flow path 39, the main flow path 18, and the supply route 14 to the liquid-phase flow path of the semiconductor manufacturing apparatus not depicted.

Next, operation of the block valve in the present invention is described when, by way of example, the block valve is used as a block valve for a raw material container.

The liquid material accommodate in the raw material container 51 is supplied via the liquid-phase flow path (discharge pipe) 52 by the pressure of an inert carrier gas such as He or $N_2$ to the block valve for the raw material container 50. When the tank gate valve 55 is set in an open state and the purge gas introduction automatic valve 56 is set in a closed state, the liquid material is supplied, as indicated by hollow arrows in FIG. 4, via the connection line 16, the communication path 19, the first minimal port part 21, the flow path 38, the main flow path 18, and the supply route 14 of the block valve for the raw material container 50 to the liquid-phase flow path of the semiconductor manufacturing apparatus not depicted. Here, by adjusting the degree of opening of the tank gate valve 55, the supply flow rate of the liquid material to the semiconductor manufacturing apparatus can be adjusted.

When the liquid material is attached as solid material to a wall surface of the supply route 14 of the block valve for the raw material container 50 and/or a wall surface of the liquid-phase flow path of the semiconductor manufacturing apparatus or when the raw material container 51 is replaced, a purge process is required. To perform a purge process, supply of the carrier gas to the raw material container 51 is stopped, and the tank gate valve 55 is set in a closed state. When supply of the carrier gas is stopped, the pressure for supplying the liquid material to the semiconductor manufacturing apparatus disappears. Therefore, when the liquid material remains in the supply route 14 of the block valve for the raw material container 50 and/or the liquid-phase fluid path of the semiconductor manufacturing apparatus, the remaining liquid material flows back via the supply route 14, the main flow path 18, the flow path 38, and the first minimal port part 21 to flow into the tank gate valve 55.

The joint port part 23 is provided at the lowermost position in the tank gate valve 55 below the first minimal port part 21, this joint port part 23 communicates with the connection line 16 by the communication path 19 with a downward tilt, and this connection line 16 is connected to the liquid-phase flow path 52 of the raw material container 51. Therefore, the liquid material flowing from the first minimal port part 21 into the tank gate valve 55 naturally (automatically) flows to return to the raw material container 51 via the joint port part 23, the communication path 19, the connection line 16, and the liquid-phase flow path 52. Thus, the liquid material does not remain in the tank gate valve 55.

After the tank gate valve 55 is set in a closed state, the purge gas introduction automatic valve 56 is set in an open state to introduce the purge gas into the block valve for the raw material container 50 to carry out a purge process. The purge gas is suppled, as indicated by black arrows in FIG. 4, via the purge in-port part 58, the flow path 20, the port opening 25, the second minimal port part 22, the flow path 39, the main flow path 18, and the purge out-port 57 to the liquid-phase flow path of the semiconductor manufacturing apparatus not depicted, to perform a purge process.

As describe above, when supply of the carrier gas is stopped, at the same time, the liquid material remaining in the supply route 14 of the block valve for the raw material container 50 and/or the liquid-phase flow path of the semiconductor manufacturing apparatus automatically flows to return via the tank gate valve 55 to the raw material container 51. However, depending on operation timing of the tank gate valve 55 and the purge gas introduction automatic valve 56, a situation can occur in which the purge gas introduction automatic valve 56 becomes in an open state before the liquid material flows to return to the raw material container 51 and the liquid material flows into the purge gas introduction automatic valve 56 to remain in a portion below the seat part 27.

The purge gas to be supplied to the block valve for the raw material container 50 is introduced via the purge gas in-port part 58, the communication path 20, and the port opening 25 into the purge gas introduction automatic valve 56. Since the port opening 25 is provided at the lowermost position in the purge gas introduction automatic valve 56 below the second minimal port part 22, the purge gas introduced from the port opening 25 into the purge gas introduction automatic valve 56 can push up the liquid material remaining in the purge gas introduction automatic valve 56 from its bottom and can push out the liquid material from the second minimal port part 22 to the main flow path 18 outside the purge gas introduction automatic valve 56. Thus, the liquid material does not remain in the purge gas introduction automatic valve 56.

Also, since the main flow path 18 is connected to the first minimal port part 21 of the tank gate valve 55 and the second minimal port part 22 of the purge gas introduction automatic valve 56 by the minimal-capacity flow paths 38 and 39, the capacity of the main flow path 18, the flow path 38, and the flow path 39 altogether is extremely small. Thus, due to a fault in operation timing of the tank gate valve 55 and the purge gas introduction automatic valve 56, even if the liquid material remains in their flow paths, the residue amount is small, and can be easily pushed out to the outside of the block valve for the raw material container 50 via the purge gas out-port 57 by the pressure of the purge gas introduced via the purge gas introduction automatic valve 56.

Also, not only the capacity of the main flow path 18, the flow path 38, and the flow path 39 altogether is extremely small, but also the area of the wall surfaces of the flow paths wetted by the liquid material inside these flow paths is small. Thus, when the liquid material does not remain in these flow paths, it is possible to remove the liquid material wetting these wall surfaces of the flow paths in a shorter time.

As described above, the block valve and the block valve for the raw material container in the present invention are configured to allow the liquid to automatically flow from the lowermost position in the diaphragm valve to the outside of the valve to prevent the liquid from remaining in the valve, and are configured to introduce the purge gas into the valve from the lowermost position in the diaphragm valve to push out the liquid remaining in the valve to the outside of the valve to prevent the liquid from remaining in the valve. In this manner, since the liquid does not remain in the valve, a purge process can be reliably performed, and a purge process time can be significantly reduced. Also, since the liquid does not remain in the valve, a situation can be prevented in which the liquid remaining in the valve after the raw material container is removed from the semiconductor manufacturing apparatus is exposed to the atmosphere to undergo an oxidation reaction to cause a malfunction of the valve.

Also, with provision of the suspension-type pressing seat members to the diaphragms, it is not required to provide recesses for accommodating the seats on a valve opening side, the flow path for coupling the minimal port part and the main flow path of the diaphragm valve is shortened, and the capacity is minimized. Therefore, the liquid remaining in these flow paths can be easily pushed out by the purge gas to the outside of the block valve, and the liquid wetting the wall surfaces of these flow paths can undergo a purge process in a short time.

In addition, when the viscosity of the liquid material is high and the liquid material is difficult to be returned to the raw material container 51, by heating the block body 11 by a heater arranged in the heater attachment hole 11a, the viscosity of the liquid material can be decreased to increase fluidity to make the liquid material to be easily returned to the raw material container 51. Also, by heating the block body by the heater, it is possible to promote evaporation of the liquid material wetting the wall surfaces of the flow paths and evaporate and remove an oxidation source (such as moisture) attached to a flow path inside the block body and in the valve by atmospheric exposure after the raw material container 51 is removed from the semiconductor manufacturing apparatus.

In the foregoing, operations and effects of the block valve and the block valve for the raw material container in the present invention have been described when the fluid to be controlled is a liquid. However, it goes without saying that, as with, for example, a bubbling-type raw material container, the block valve and the block valve for the raw material container can be used even if the fluid to be controlled is an air. Even if the fluid to be controlled is an air, the purge gas introduced from the lowermost position in the diaphragm valve can effectively discharge air remaining in the valve to the outside of the valve. Also, the diaphragm valve capable of being coupled to the main flow path by only providing a suspension-type pressing seat member to the diaphragm and providing a minimal flow path on a valve opening side contributes to a reduction in flow path length formed inside the block body, and allows a reduction in time for performing a purge process on the air remaining in the flow paths.

The block valve and the block valve for the raw material container in the present invention can be configured to be made compact with less components than those of conventional valves for containers, and a purge process can be performed in a short time to keep purity of the liquid material to be supplied to the semiconductor manufacturing apparatus or the like, and therefore its utility value is extremely large.

Figure 6:
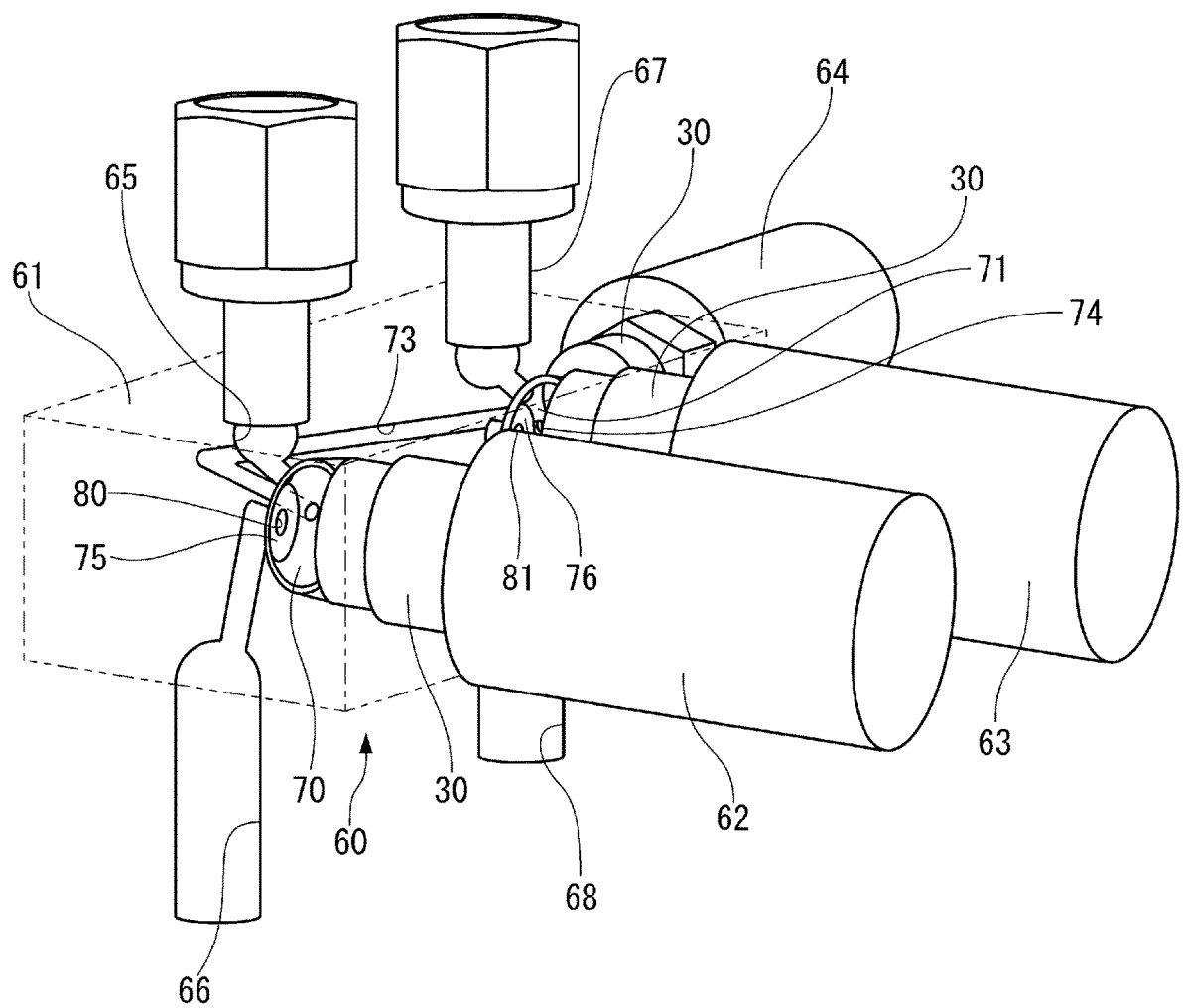
FIG. 6 is a schematic view depicting another embodiment of the block valve in the present invention.

In FIG. 6, another embodiment of the block valve in the present invention is depicted. Note that in this embodiment, a portion identical to that of the above-described embodiment is represented by the same sign and description of that portion is omitted.

In the drawing, a block valve main body 60 of this embodiment includes a block body 61, a gas-introduction-side diaphragm valve 62, a discharge-side diaphragm valve 63, a purge-purpose diaphragm valve 64, an introduction route 65, an introduction-side connection line 66, a discharge route 67, and a discharge-side connection line 68.

In the block body 61, the introduction route 65, the introduction-side connection line 66, the discharge route 67, and the discharge-side connection line 68 are integrally or separately provided. Via these routes 65 and 67 and the connection lines 66 and 68, the introduction-side diaphragm valve 62, the discharge-side diaphragm valve 63, and the purge-purpose diaphragm valve 64 are connectably provided. Inside the block valve main body 60, for connecting these, an introduction-side communicating part 70, a discharge-side communicating part 71, a purge-side communicating part 72, a connection flow path 73, and a communication flow path 74 are formed.

The introduction route 65 is provided for introduction of a carrier gas such as an inert gas. The introduction-side connection line 66 is provided on a carrier gas introduction side from the introduction route 65 to a raw material container not depicted. These introduction route 65 and introduction-side connection line 66 are communicated by the introduction-side communicating part 70 formed inside the block body 61.

The introduction-side communicating part 70 is formed in a substantially cone (substantially bowl) shape and has a space inside. The introduction route 65 is formed on a tilted surface side of this introduction-side communicating part 70, and the introduction-side connection line 66 is formed on a bottom surface side of the introduction-side communicating part 70. In the introduction-side communicating part 70, a seat part 75 is provided on an opposing side of the pressing seat member 35 of the introduction-side diaphragm valve 62, and the pressing seat member 35 is provided to this seat part 75 so as to be able to abut on and seal that part. With this, by operation of the introduction-side diaphragm valve 62, the introduction route 65 and the introduction-side connection line 66 are provided so as to be able to communicate or be interrupted.

On the other hand, the discharge route 67 is provided as a supply flow path of the raw material fluid to the semiconductor manufacturing apparatus, and the discharge-side connection line 68 is provided to a supply side from the raw material container to the discharge route 67. These discharge route 67 and discharge-side connection line 68 are communicated by the discharge-side communicating part 71 formed inside the block body 61. The discharge-side communicating part 71 has a space formed in a cone shape. The discharge route 67 is formed on a tilted surface side of this discharge-side communicating part 71, and the discharge-side connection line 68 is formed on a bottom surface side of the discharge-side communicating part 71. In the discharge-side communicating part 71, a seat part 76 is provided on an opposing side of the pressing seat member 35 of the discharge-side diaphragm valve 63, and the pressing seat member 35 is provided to this seat part 76 so as to be able to abut on and seal that part. With this, by operation of the discharge-side diaphragm valve 63, the discharge route 67 and the discharge-side connection line 68 are provided so as to be able to communicate or be interrupted.

Furthermore, the purge-side communicating part 72 is provided inside the block body 61. This purge-side communicating part 72 has a space formed in a cone shape. On a bottom surface side of the purge-side communicating part 72, the communication flow path 74 communicating with the discharge-side communicating part 71 is formed. On an outer peripheral side of this communication flow path 74, as with the above, a seat part 77 which the pressing seat member 35 of the purge-purpose diaphragm valve 64 can abut on and seal is provided. On a tilted surface side of the purge-side communicating part 72, the connection flow path 73 which causes this purge-side communicating part 72 and the introduction-side communicating part 70 to be communicated with each other is formed. While formed as being bent in a substantially L shape in the present embodiment, the connection flow path 73 may be formed in any shape and is preferably provided in a shape in which the fluid is less prone to be retained.

With the above-described structure, the introduction route 65 of the block valve main body 60 and the connection flow path 73 are always in a communication state via the introduction-side communicating part 70. On the other hand, the discharge route 67 and the communication flow path 74 are always in a communication state via the discharge-side communicating part 71.

The introduction-side diaphragm valve 62, the discharge-side diaphragm valve 63, and the purge-purpose diaphragm valve 64 are provided to have a structure similar to that of the above-described first diaphragm valve 12 (second diaphragm valve 13), and each have the casing 30, the diaphragm 32, the actuation mechanism 33, and the pressing seat member 35. At a position opposing this pressing seat member 35, valve openings 80, 81, and 82 each having a minimal port part are provided. In these diaphragm valves 62, 63, and 64, when the diaphragm 32 is actuated by the actuation mechanism 33, the pressing seat members 35 make contact with and go away from the seat parts 75, 76, and 77 of the valve openings 80, 81, and 82 to cause open/close operation of the respective valves, thereby allowing the flow paths in the block body 61 to be switched.

In this block valve main body 60, the introduction-side diaphragm valve 62 is used to supply or stop the inert gas to the raw material container, the discharge-side diaphragm valve 63 is used to supply or stop the raw material fluid in the raw material container to a process chamber, and the purge-purpose diaphragm valve 64 is used to supply or stop the inert gas for purging the flow paths before each joint between the introduction route 65 and the discharge route 67 is removed at the time of replacement of the raw material container or the like.

Subsequently, a case in which the flow path of the block valve main body 60 of FIG. 6 is switched is described.

Figure 7:
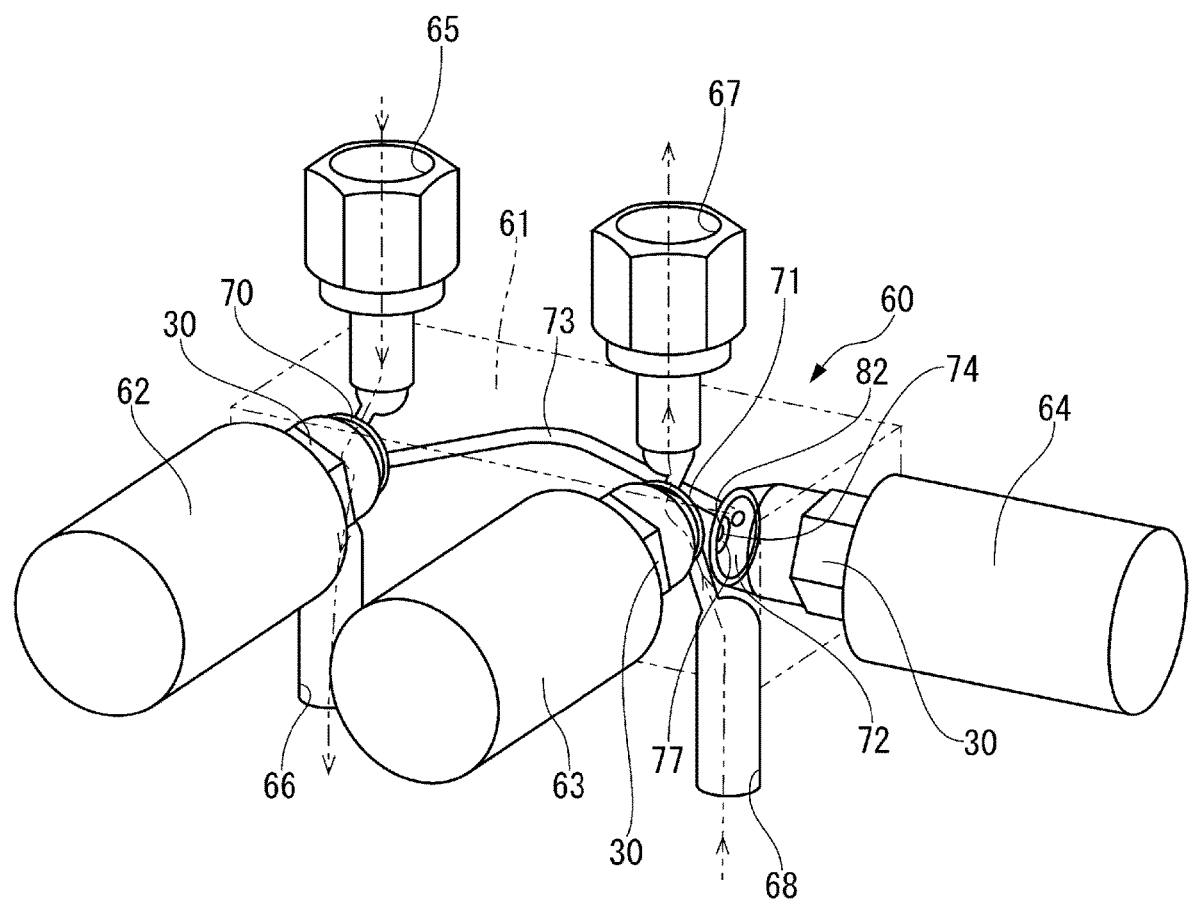
FIG. 7 is a schematic view depicting the block valve of FIG. 6 at a processing process.

In FIG. 7, a processing process by the block valve main body 60, that is, a state when a raw material fluid in a raw material container is supplied to a secondary side, is depicted. FIG. 8(a) is a schematic view of a portion near the introduction route 65 of FIG. 7, and FIG. 8(b) is a schematic view of a portion near the discharge route 67 of FIG. 7.

In this case, in FIG. 7 and FIG. 8, the introduction-side diaphragm valve 62 and the discharge-side diaphragm valve 63 are set in a valve-open state, and the purge-purpose diaphragm valve 64 is set in a valve-closed state. In this state, when an inert gas is introduced into the introduction route 65, as indicated by arrows of FIG. 8(a), the inert gas passes from the introduction route 65 through the introduction-side communicating part 70 inside the introduction-side diaphragm valve 62 to the raw material container from the introduction-side connection line 66.

The raw material fluid in the raw material container is, as depicted by arrows of FIG. 8(b), pumped by the inert gas from the discharge-side connection line 68, passes through the discharge-side communicating part 71 inside the discharge-side diaphragm valve 63, and is fed into a process chamber on a secondary side not depicted via the discharge route 67. In this case, ON/OFF switching at the time of supply of the raw material fluid is performed by opening/closing operation of the discharge-side diaphragm valve 63.

Figure 9:
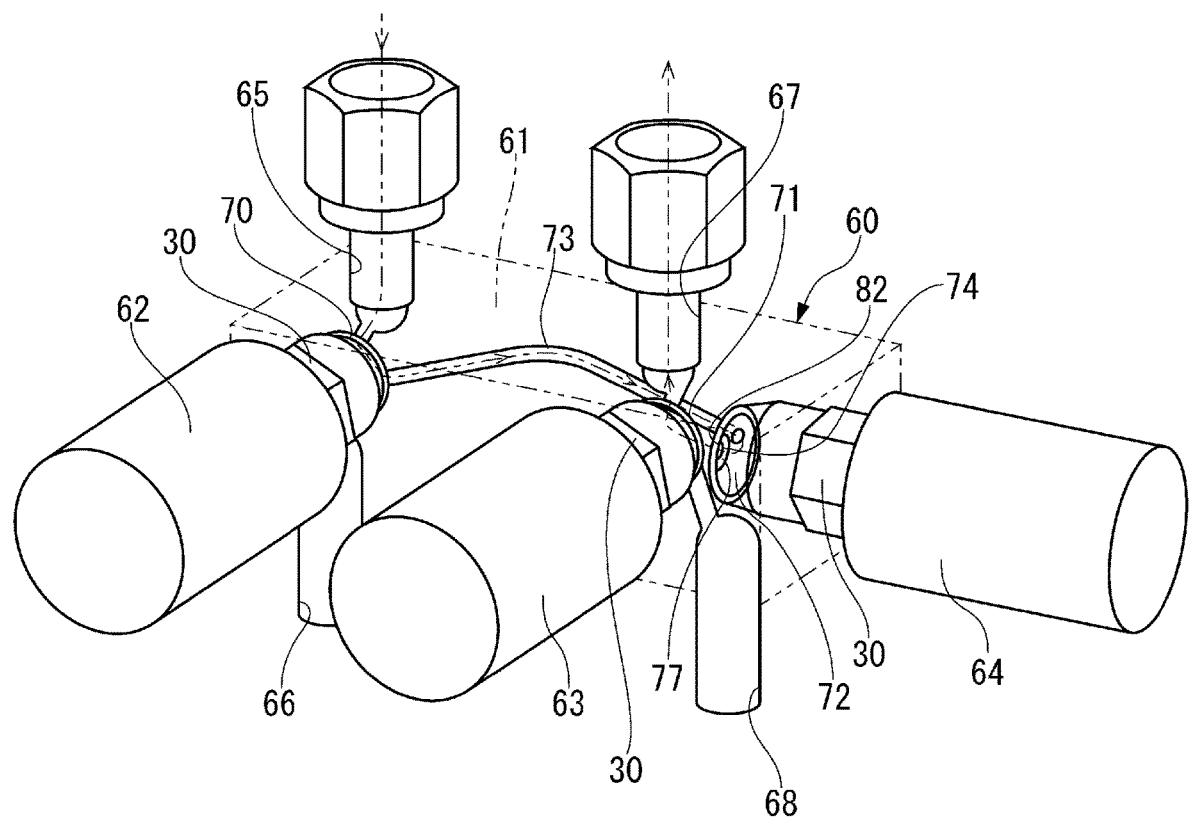
FIG. 9 is a schematic view depicting the block valve of FIG. 6 at a purge process.

On the other hand, in FIG. 9, a purge process by the block valve main body 60, that is, a state when inner retained gas is discharged outside, is depicted. FIG. 10(a) is a schematic view depicting a portion near the introduction route 65 of FIG. 9, and FIG. 10(b) is a schematic view depicting a portion near the seat part 75 of FIG. 10(a). As depicted in FIG. 10(b), the introduction route 65 and the connection flow path 73 of FIG. 10(a) are disposed actually at an angle of 90°. FIG. 11(a) is a schematic view depicting a portion near the discharge route 67 of FIG. 9, and FIG. 11(b) is a schematic view depicting a portion near the seat part 76 of FIG. 11(a). As depicted in FIG. 11(b), the communication flow path 74 and the discharge route 67 of FIG. 11(a) are disposed actually at an angle of 90°.

In this case, in FIG. 9 to FIG. 11, the introduction-side diaphragm valve 62 and the discharge-side diaphragm valve 63 are set in a valve-closed state, and the purge-purpose diaphragm valve 64 is set in a valve-open state. With this, when the inert gas is introduced to the introduction route 65, as indicated by arrows in FIG. 10(a) and FIG. 10(b), the inert gas passes from the introduction route 65 to the introduction-side communicating part 70 inside the introduction-side diaphragm valve 62 and passes through the connection flow path 73 to be fed into the purge-side communicating part 72 of the purge-purpose diaphragm valve 64.

Here, with the discharge-side diaphragm valve 63 being in a closed state, as depicted in FIG. 11(a) and FIG. 11(b), the inert gas passes through the communication flow path 74 to be exhausted outside via the discharge route 67. In this manner, the retained gas remaining inside the block valve main body 60 can be purged by the inert gas.

In the above-described block valve main body 60, the introduction route 65 and the connection flow path 73 of the diaphragm valve are provided at an angle of 90°, and the communication flow path 74 and the discharge route 67 thereof are provided at an angle of 90°. In the block valve of the present invention, however, these flow paths and routes can be provided also at any angle. For example, purge may be performed by a scheme referred to as so-called cyclone purge, in which these are provided in parallel to each other and the fluid from an inlet side flows out as swirling like a tornado around the valve body and is then discharged from an outlet side. In this case, by appropriately setting various conditions such as arrangement of an inlet-side flow path and an outlet-side flow path, fluid-flowing direction, fluid pressure, flow rate, and fluid characteristics and by letting the fluid flow so as to swirl along the cone-shaped communicating part, highly efficient purge can be made.

In the block valve main body 60, for one block body 61, a flow path on a gas introduction side is provided by the introduction route 65, the introduction-side connection line 66, and the introduction-side communicating part 70, a flow path on a discharge side is provided by the discharge route 67, the discharge-side connection line 68, and the discharge-side communicating part 71, and these are connected by the connection flow path 73, the communication flow path 74, and the purge-side communicating part 72. Thus, the capacity of the space where the fluid flows can be decreased to the minimum to suppress a dead volume; retention of the liquid material in the valve can be reliably inhibited by the operation of the introduction-side diaphragm valve 62, the discharge-side diaphragm valve 63, and the purge-purpose diaphragm valve 64 connected to the block body 61; and changes in concentration can be suppressed at the time of supply of the raw material fluid by the carrier gas and gas exchange characteristics (purge performance) at the purge process can be improved to allow a purge processing time to be significantly reduced. In this case, impact purge by a more effective carrier gas by vacuum/cycle purge can be achieved without reconstructing the lines.

As described above, for one block body 61, the introduction route 65, the introduction-side connection line 66, the discharge route 67, the discharge-side connection line 68, the introduction-side diaphragm valve 62, the discharge-side diaphragm valve 63, and the purge-purpose diaphragm valve 64 are provided. Thus, the entire block valve main body 60 can be unitized to facilitate handling at the time of attachment and removal and achieve compactness, thereby also allowing attachment to an existing facility. In this case, the introduction route 65 and the discharge route 67 can be easily attached to and removed from a pipe line, thereby also facilitating exchange of the raw material container.

As with the above-described block valve 10, the inside of the valve chamber, that is, the side surface of the introduction-side communicating part 70, the discharge-side communicating part 71, and the purge-side communicating part 72, is provided in a tilted-surface shape. Thus, processing is easy, and the spaces (capacities) inside of the valve chamber of these can be minimized as much as possible.

Furthermore, with the side surface of these introduction-side communicating part 70, discharge-side communicating part 71, and purge-side communicating part 72 provided in a tilted-surface shape, the contact gas surface area inside the valve chamber can be made small, and drought characteristics also referred to as so-called dry-down characteristics can also be improved.

Thus, even if a liquid material or easily-liquefiable material becomes liquefied to be attached to the tilted surface, the liquefied material flows over these introduction-side communicating part 70, discharge-side communicating part 71, and purge-side communicating part 72, thereby making the inside of the valve chamber less polluted.

For the block body 61, the introduction route 65, the introduction-side connection line 66, the discharge route 67, and the discharge-side connection line 68 are linearly arranged in a direction of connection with the pipe line. With respect to the introduction-side diaphragm valve 62 and the discharge-side diaphragm valve 63 aligned on one side surface of the block valve main body 60, the purge-purpose diaphragm valve 64 is provided in an orthogonal direction. With this arrangement, compared with the case in which these are provided at opposing positions, the entirety can be made compact, and can be installed even in a narrow place. Since these diaphragm valves 62, 63, and 64 are not tilted with respect to the block body 61, female threads and so forth at an attached portion of the block body 61 can also be easily processed.

From these, the block valve main body 60 is suitable for use purposes such as, in particular, raw material bottles for MOCVD and its related facilities, liquid supply bottles for CVD apparatuses, LDS mother tanks for centralized supply, or bottles for filling factories and facilities of raw material manufacturers.

Also, an introduction-side manual diaphragm valve not depicted may be connected between the introduction-side diaphragm valve 62 and the introduction-side connection line 66 of FIG. 6 and a discharge-side manual diaphragm valve not depicted may be connected between the discharge-side diaphragm valve 63 and the discharge-side connection line 68 thereof. Here, these manual diaphragm valves are provided so as to be manually operable by handle operation and are provided so as to be lockable at a handle-closed position, and thereby an erroneous operation is preventable.

In this case, if the introduction-side and discharge-side manual diaphragm valves in addition to the introduction-side and discharge-side diaphragm valves are set in a closed-state at the time of container transport or the like, the container can be reliably set in a hermetically-sealed state.

REFERENCE SIGNS LIST

10 block valve
11 block main body
12 first diaphragm valve
13 second diaphragm valve
14 supply route
15 supply port part
16 connection line
18 main flow path
19 communication path
21 first minimal port part
22 second minimal port part
23 joint port part
25 port opening
32 diaphragm
35 pressing seat member
50 block valve for a raw material container
51 raw material container
55 tank gate valve
56 purge gas introduction automatic valve
57 purge gas out-port
58 purge gas in-port part
θ tilt angle

The invention claimed is:

1. A block valve comprising:
a block body;
a first diaphragm valve;
a second diaphragm valve;
a supply port part;
a connection line;
a substantially horizontal main flow path;
a supply route; and
a communication path,
wherein:
the substantially horizontal main flow path is in communication with the supply route;
the supply route extends gravitationally upward from the block body;
a center axis of the first diaphragm valve is tilted with respect to a substantially gravitational direction;
the first diaphragm valve includes a first diaphragm in a casing thereof, a first minimal port part, a first actuation mechanism, a first suspension pressing seat member, a first seat part, and a joint port part;
the second diaphragm valve has a second diaphragm in a casing thereof, a second minimal port part, a second actuation mechanism, a second suspension pressing seat member, a second seat part, and a port opening;
the first minimal port part is connected to a first side of the substantially horizontal main flow path;
the second minimal port part is connected to a second side of the substantially horizontal main flow path;
the first actuation mechanism is configured to actuate the first diaphragm;
the second actuation mechanism is configured to actuate the second diaphragm;
the first seat part consists of a first smooth surface configured to make a seal contact with a first annular projecting part of the first suspension pressing seat member;
the second seat part consists of a second smooth surface configured to make a seal contact with a second annular projecting part of the second suspension pressing seat member;
the first seat part is provided to a valve opening of the first minimal port part;
the second seat part is provided to a valve opening of the second minimal port part;
the first seat part opposes the first suspension pressing seat member;
the second seat part opposes the second suspension pressing seat member;

the port opening and the supply port part are in communication;

the connection line extends gravitationally downward from the block body and is configured to be connected to a raw material container;

the joint port part and the connection line are connected by the communication path;

a center axis of the communication path is tilted with respect to the substantially gravitational direction;

the supply port part is at a lowermost part of the block body and is in communication with the port opening at a position which is lower than the second seat part;

the joint port part is below the first minimal port part and at a lowermost position in the first diaphragm valve; and the block valve is configured to, in a purge process, stop a supply of a carrier gas to the raw material container and set the first diaphragm valve in a closed state.

2. The block valve according to claim 1, further comprising a heater in the block body.

3. The block valve according to claim 2, wherein the heater is configured to remove a material configured to wet a wall surface of the substantially horizontal main flow path and an oxidation source attached by atmospheric exposure by heating.

4. A block valve for a raw material container, the block valve comprising:

a block body;

a tank gate valve which is a first diaphragm valve;

a purge gas introduction automatic valve which is a second diaphragm valve;

a purge gas in-port part which is a purge gas supply port part;

a liquid-phase flow path which is a connection line;

a substantially horizontal main flow path;

a purge gas out-port which is a supply route;

a communication path, wherein:

the substantially horizontal main flow path is in communication with the purge gas out-port;

the purge gas out-port extends gravitationally upward from the block body;

a center axis of the tank gate valve is tilted with respect to a substantially gravitational direction;

the tank gate valve includes a first diaphragm in a casing thereof, a first minimal port part, a first actuation mechanism, a first suspension pressing seat member, a first seat part, and a joint port part;

the purge gas introduction automatic valve has a second diaphragm in a casing thereof, a second minimal port part, a second actuation mechanism, a second suspension pressing seat member, a second seat part, and a port opening;

the first minimal port part is connected to a first side of the substantially horizontal main flow path;

the second minimal port part is connected to a second side of the substantially horizontal main flow path;

the first actuation mechanism is configured to actuate the first diaphragm;

the second actuation mechanism is configured to actuate the second diaphragm;

the first seat part consists of a first smooth surface configured to make a seal contact with a first annular projecting part of the first suspension pressing seat member;

the second seat part consists of a second smooth surface configured to make a seal contact with a second annular projecting part of the second suspension pressing seat member;

the first seat part is provided to a valve opening of the first minimal port part;

the second seat part is provided to a valve opening of the second minimal port part;

the first seat part opposes the first suspension pressing seat member;

the second seat part opposes the second suspension pressing seat member;

the port opening and the purge gas in-port part are in communication;

the liquid-phase flow path extends gravitationally downward from the block body and is configured to be connected to a raw material container;

the joint port part and the liquid-phase flow path are connected by the communication path;

a center axis of the communication path is tilted with respect to the substantially gravitational direction;

the purge gas in-port part is at a lowermost part of the block body and is in communication with the port opening at a position which is lower than the second seat part;

the joint port part is below the first minimal port part and at a lowermost position in the tank gate valve; and the block valve is configured to, in a purge process, stop a supply of a carrier gas to the raw material container and set the tank gate valve in a closed state.

5. The block valve according to claim 4, further comprising a heater in the block body.

6. The block valve according to claim 5, wherein the heater is configured to remove a material configured to wet a wall surface of the substantially horizontal main flow path and an oxidation source attached by atmospheric exposure by heating.

* * * * *